United States Patent [19]

Trzasko et al.

[11] Patent Number: 4,626,288
[45] Date of Patent: Dec. 2, 1986

[54] STARCH DERIVATIVES FORMING REVERSIBLE GELS

[75] Inventors: Peter T. Trzasko, Plainsboro; Martin M. Tessler, Edison; Teresa A. Dirscherl, North Plainfield, all of N.J.

[73] Assignee: National Starch and Chemical Corporation, Bridgewater, N.J.

[21] Appl. No.: 808,408

[22] Filed: Dec. 12, 1985

Related U.S. Application Data

[63] Continuation-in-part of Ser. No. 690,423, Jan. 10, 1985, abandoned.

[51] Int. Cl.$^4$ .................. C08L 3/06; C08L 3/08; C08L 3/10
[52] U.S. Cl. ................... 106/210; 106/211; 106/212; 106/213
[58] Field of Search ............... 536/102, 107, 111, 45, 536/48, 50, 106; 106/210, 211, 213

[56] References Cited

U.S. PATENT DOCUMENTS

| Re. 28,809 | 5/1976 | Tessler | 536/107 |
|---|---|---|---|
| 1,959,590 | 5/1934 | Lorand | 260/101 |
| 2,661,349 | 12/1953 | Caldwell et al. | 536/107 |
| 2,876,217 | 3/1959 | Paschall | 536/50 |
| 3,345,358 | 10/1967 | Inklaar | 260/233.5 |
| 3,720,663 | 3/1973 | Tessler | 536/107 |
| 3,969,340 | 7/1976 | Tessler | 536/106 |
| 3,992,432 | 11/1976 | Napier et al. | 260/465.1 |
| 4,020,272 | 4/1977 | Tessler | 536/107 |
| 4,029,544 | 7/1977 | Jarowenko | 536/107 |
| 4,387,221 | 6/1983 | Tessler | 536/107 |
| 4,501,888 | 2/1985 | Schmidt | 536/110 |

FOREIGN PATENT DOCUMENTS 1139393 6/1957 France .

OTHER PUBLICATIONS

Chemical Abstract Vol. 87, 1977 No. 119635x (JP-A-76-123784).

Primary Examiner—Ronald W. Griffin
Attorney, Agent, or Firm—Lori D. Tolly; Edwin M. Szala

[57] ABSTRACT

Starch derivatives capable of forming reversible gels are provided. Aqueous dispersions or solutions of the derivatives form thermally reversible hot gels at temperatures above 70° C. and a pH of 3–8, in addition to exhibiting substantial increases in viscosity upon cooling from 95° to 70° C. The starch derivative may be alkali gelatinized at a pH 13 or above and the gel formed at a pH of from 1–10. The gelling agents are starch ethers or starch esters having an amylose content of at least 17% by weight with the ether or ester substituent comprising a linear saturated or unsaturated hydrocarbon chain of at least 12 carbon atoms.

20 Claims, 1 Drawing Figure

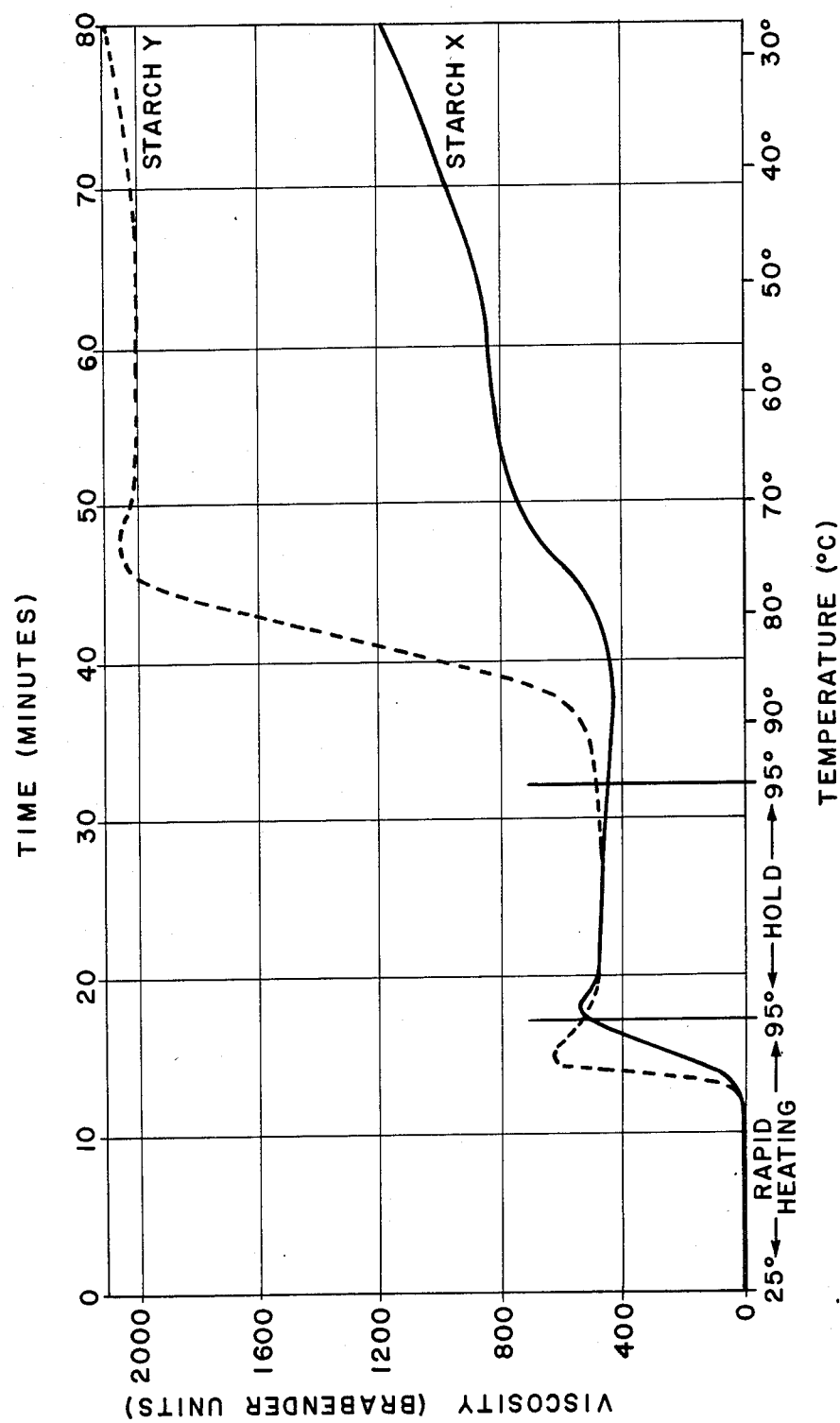

STARCH DERIVATIVES FORMING REVERSIBLE GELS

This is a continuation-in-part of Ser. No. 690,423, filed on Jan. 10, 1985, now abandoned.

BACKGROUND OF THE INVENTION

This invention relates to starch derivatives which form reversible gels, some of which form hot gels.

In many compositions, especially those of food systems, starches are often employed in order to provide a gel texture to the composition. Unless the starch is used in a pregelatinized form, the starchcontaining composition must be cooked to effect gelatinization of the starch granules and then cooled, usually for a period of 12 to 24 hours at room temperature, in order to allow gel formation to occur.

It is well known that starch is composed of two fractions, the molecular arrangement of one being linear and the other being branched. The linear fraction of starch is known as amylose and the branched fraction as amylopectin. Gel formation is attributed to the retrogradation of the amylose portion of starch. After gelatinization and upon cooling, the linear chains become oriented in parallel alignment due to the affinity of the chain hydroxyl groups for one another. The hydroxyl groups form associations through hydrogen bonds and the chains are thus bound together forming aggregates which are insoluble in water. In dilute aqueous systems the retrograded starch will precipitate while concentrated solutions or dispersions of the retrograded starch will form a gel. It is well known that phase transformation of a starch gel to a flowable liquid upon heating and reformation of the gel upon cooling are not often readily achieved. Starch gels which require little or no shear in order to melt upon heating are referred to as being thermoreversible.

When a thickened amylose-containing composition which does not form a gel is desired, a derivatized starch is often employed. By introducing substituent groups along the starch chain to interfere with the retrogradation process, non-gelling starches are obtained which are referred to as being stabilized. Common stabilization modifications may be accomplished by esterifying or etherifying some of the hydroxyl groups along the starch chain.

The following references describe various starch ester and starch ether preparations.

U.S. Pat. No. 2,661,349 (issued on Dec. 1, 1953 to Caldwell et al.) is directed to the preparation of substituted polysaccharides by reacting starch with succinic or glutaric acid anhydrides containing a $C_5$–$C_{18}$ substituent group to produce starch acid esters.

U.S. Pat. No. 2,876,217 (issued on Mar. 3, 1959 to E. Paschall) is directed to the preparation of cationic starch ethers by treating starch with the reaction product of epihalohydrin and a tertiary amine. The reagent is said to contain alkyl or alkenyl radicals which may comprise up to 18 carbon atoms.

U.S. Pat. No. Re. 28,809 (issued May 11, 1976 to M. Tessler), which is a reissue of U.S. Pat. No. 3,720,663 (issued on Mar. 13, 1973 to M. Tessler), is directed to the preparation of starch esters by reacting starch with an imidazolide of a $C_1$–$C_{20}$ monocarboxylic or monosulfonic acid. U.S. Pat. No. 4,020,272 (issued on Apr. 26, 1977 to M. Tessler) further describes starch esters prepared by reactions of starch with N,N'-disubstituted imidazolium salts of $C_1$–$C_{20}$ monocarboxylic or monosulfonic acids.

U.S. Pat. No. 4,387,221 (issued on June 7, 1983 to M. Tessler et al.) is directed to the preparation of $C_1$–$C_{22}$ alkyl or alkenyl sulfosuccinate starch half esters.

There are many food and industrial systems which would benefit by employing a body and consistency imparting vehicle, i.e., a thickener, which have the ability to form a gel texture rapidly while hot instead of requiring the system to cool substantially before gel formation begins. Systems which would form a gel without any heating would also be useful in food systems which require no cooking.

Moreover, it would be of considerable importance to provide a gel which is easily capable of phase transformation upon cooling or heating in order to render subsequent homogeneous incorporation of solid or dissolved components to the system.

There is therefore a need for gelling starches which rapidly form reversible gels at room temperature without cooking or at relatively high temperatures after cooking. There is also a need for gelling starches which form hot gels after cooking.

SUMMARY OF THE INVENTION

The present invention provides an aqueous reversible gelling agent, which comprises a water-soluble or water-dispersible starch derivative containing an ether or ester substituent group with an at least $C_{12}$ linear hydrocarbon chain, wherein the starch is an unmodified or modified starch having an amylose content of at least 17% by weight and the modified starch is a lightly derivatized, lightly converted, and/or lightly cross-linked starch and wherein the starch is rendered water-soluble or water-dispersible by thermal or alkali gelatinization; characterized in that a reversible gel is formed by an aqueous solution or dispersion of the thermally-gelatinized starch derivative at a pH of about 3–8 or of the alkali-gelatinized starch at a pH of about 1–10. The gel structure can be reversed by reheating the gel at a pH of 3–8 or by adjusting the pH to 13 or above.

In a preferred embodiment, high temperature gels are formed by the thermally-gelatinized starch at a pH of about 4–7 and at a temperature above 70° C. and below that temperature at which the gel becomes thermoreversible, with the aqueous dispersion of the starch derivative exhibiting a substantially greater increase in viscosity during cooling from 95° to 70° C. than that of a modified or unmodified starch without the substituent with the at least $C_{12}$ linear hydrocarbon chain.

By the attachment of long linear hydrocarbon substituents onto the starch molecule, many non-gelling starch bases including some chemically stabilized bases, do become gelling starches, which are in addition high temperature gelling starches when the starch is thermally-gelatinized and the pH is between about 3–8, preferably 4–6.

The high temperature gelling starches herein are useful as thickeners in food systems where it is desirable to provide a gel texture at temperatures significantly above those of conventional gelling starches, e.g. 70° C., and moreover, a gel which is thermoreversible in order to facilitate easy incorporation of ingredients into a foodstuff after gel formation has occurred.

None of the above references contemplate or disclose the unique high temperature gelling properties or the reversible gels possessed by the starches described herein.

The present invention further provides an improved process for preparing starch half-acid esters in water which comprises the step of reacting the starch under alkaline conditions with a hydrophobic-substituted cyclic dicarboxylic acid anhydride in the presence of a phase transfer agent.

BRIEF DESCRIPTION OF THE DRAWING

The single FIGURE is a graph illustrating the substantial increase in viscosity of a 7% aqueous dispersion of a specific high temperature gelling corn starch derivative Y of Example 2 upon cooling, after thermal gelatinization in comparison to an underivatized corn starch base X.

DESCRIPTION OF THE PREFERRED EMBODIMENTS

The applicable starch bases which may be used in the preparation of the high temperature gelling starches herein include those starches which contain at least about 17% amylose such as may be derived from sources including corn, potato, tapioca, rice, sago, wheat, sorghum, high amylose corn and the like. Starches which contain less amylose, such as waxy maize, are not applicable herein. Starch flours may also be used as a starch source.

The derivatizing reagents useful in the preparation of the high temperature gelling derivatives herein include any etherifying or esterifying reagents which possess a linear chain saturated or unsaturated hydrocarbon comprising at least 12 carbon atoms. While not wishing to be bound by any theory or mechanism, it is currently believed that high temperature gel formation and gel reversibility are functions of the ability of the covalently bound long linear chain hydrocarbon groups to form complexes with the amylose component of starch. In some instances, i.e., when the hydrocarbon chain is adjacent to a sterically hindering group such as a carboxyl group (in the case when starch half acid esters are prepared) or a quaternary alkyl-substituted amine group (when a cationic reagent is employed), the length of the hydrocarbon chain required for high temperature gel formation will generally comprise at least 14 carbon atoms. The increase in the necessary chain length compensates for what is believed to be the steric group's hindering effect which limits the length of the hydrocarbon chain available for complexation.

A suitable class of reagents useful for preparing high temperature gelling starch esters herein include the imidazolides or N,N'-disubstituted imidazolium salts of carboxylic or sulfonic acids such as those described in U.S. Pat. No Re. 28,809 and U.S. Pat. No. 4,020,272 (cited previously) having the general formula

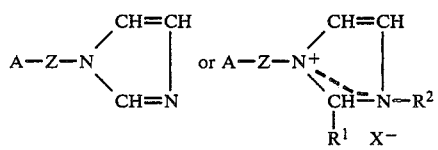

wherein Z is

or $-SO_2-$, A is a linear chain hydrocarbon of at least 12 carbon atoms, $R^1$ is H or $C_1-C_4$ alkyl, $R^2$ is $C_1-C_4$ alkyl, and X- is an anion.

Another suitable class of reagents useful herein which produce high temperature gelling starch half-acid esters include substituted cyclic dicarboxylic acid anhydrides such as those described in U.S. Pat. No. 2,661,349 (cited previously) having the structure

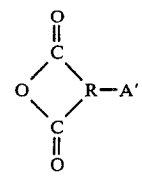

wherein R is a dimethylene or trimethylene radical and A' is a linear chain hydrocarbon of at least 14 carbon atoms. The di- or trimethylene radical may contain other substituent groups such as sulfonic acid or lower alkyl ($C_1-C_4$) which would not affect the high temperature gelling property.

A third class of reagents useful herein include the etherifying reagents described in U.S. Pat. No. 2,876,217 (cited previously) comprising the reaction product of an epihalohydrin with a tertiary amine having the structure

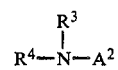

wherein $R^3$ and $R^4$ are independantly H or a $C_1-C_4$ alkyl and $A^2$ is a linear chain hydrocarbon comprising at least 14 carbon atoms.

The starch etherification or esterification reactions may be conducted by a number of techniques known in the art employing, for example, an aqueous reaction medium, an organic solvent medium, or a dry heat reaction technique. The gelling starches herein are preferably prepared employing an aqueous reaction medium at temperatures between 20° and 45° C.

Although an unmodified starch base is preferably employed in the preparation of the high temperature gelling starches, some light to moderately converted starches prepared by procedures well known to those skilled in the art are also useful. It is believed starch molecular weight affects the gel forming capabilities of the derivatives herein. It has been observed that a gelling starch will exhibit weaker gel formation as the degree of conversion of the starch base is increased. Thus, unconverted starches having higher molecular weights will be expected to provide the most significant gel formation. It has also been observed that the maximum degree of conversion (readily determinable by routine experimentation) which will still provide an acceptable gelling product is dependant upon the starch source and type of long linear chain derivatization employed.

Lightly crosslinked starch bases may also be rendered gelling by the methods described herein. The maximum level of crosslinking useful, which will vary depending on the starch base, crosslinking agent, and long linear chain reagent employed, may be easily determined by routine experimentation.

The present invention is also useful for providing gelling properties to starches which contain other functional ionic and non-ionic groups. Of considerable importance is the ability of the long linear chain hydrocarbon substituents to reverse to some extent the stabilizing effect provided by other functional groups on starch. For example, corn starches which have been stabilized with propylene oxide to hydroxypropyl degrees of substitution of 0.144 or less were made gelling after treatment with tetradecenylsuccinic anhydride. The maximum degree of additional substitution on the gelling starches herein will be understood to vary depending on the starch base and its derivatization as well as the long linear chain reagent employed.

The gelling starches herein may be additionally modified as described above at a time either prior to, simultaneously with, or subsequent to reaction with the long linear chain hydrocarbon esterifying or etherifying reagent. The skilled practitioner will of course recognize that certain starch modification reactions that employ conditions which render the long chain reagent or gelling derivative unstable must be conducted prior to reacting the starch with the long chain reagent.

Methods for preparing the modified starches herein are well-known to those skilled in the art and discussed in the literature. See, for example, R. L. Whistler, Methods in Carbohydrate Chemistry, Vol. IV, 1964, pp. 279-311; R. L. Whistler et al., Starch: Chemistry and Technology, Second Edition, 1984, pp. 311-366; and R. Davidson and N. Sittig, Water-Soluble Resins, 2nd Ed., 1968, Chapter 2.

Due to the hydrophobic nature of certain of the long linear chain hydrocarbon reagents useful herein (i.e., substituted cyclic dicarboxylic acid anhydrides), in standard aqueous reactions, the reagents react with starch in only minor amounts, thereby leaving large quantities of residual unreacted reagent as an impurity in the final reaction product. Furthermore, the aqueous reactions proceed at relatively slow rates, as indicated by the amount of caustic consumed over time.

It has been found that granular starch may be advantageously treated with hydrophobic ($C_{10}$ or higher) hydrocarbon-substituted cyclic dicarboxylic acid anhydrides under mild aqueous reaction conditions (i.e., 20°-40° C. at a pH of 8) in the presence of at least 5%, preferably 7-15% (based on the weight of the reagent), of a phase transfer agent. These reactions proceed faster with no visible unreacted reagent appearing upon starch recovery. Suitable phase transfer agents useful herein include, in general, organic quaternary salts, tertiary amines, and polyalkylene oxide ethers or esters.

The organic quaternary salts useful herein have the general formula $(AM)^+X^-$ where A is the organic portion of the salt molecule bonded to M by four covalent linkages comprising monovalent or polyvalent hydrocarbon radicals having a total sum of at least 10 carbon atoms, M is selected from the group consisting of nitrogen, phosphorus, arsenic, antimony and bismuth, and $X^-$ is an anion which dissociates from the cation $(AM)^+$ under aqueous conditions, preferably selected from the group consisting of halogen and hydroxyl anions. The organic salts of trioctylmethyl ammonium chloride and Aliquat ® 336 (referred to as tricaprylylmethyl ammonium chloride which has a mixture of $C_8$-$C_{10}$ hydrocarbon radicals and obtained from General Mills Chemicals) are preferably employed. The salts are described in U.S. Pat. No. 3,992,432 (issued Nov. 16, 1976 to D. Napier et al.), the disclosure of which is hereby incorporated by reference. Other useful quaternary organic salts include, for example, benzyltriethyl ammonium chloride, tetra-n-butyl ammonium chloride, n-hexadecyltrimethyl ammonium bromide, n-hexadecyl pyridinium bromide, n-hexadecyl-tri-n-butyl phosphonium bromide, tetra-n-octyl ammonium bromide, and tridecylmethyl ammonium chloride.

The tertiary amines useful herein as phase transfer agents should also posses hydrocarbon radicals having a total sum of at least 10 carbon atoms. Typical tertiary amines include, for example, octyldimethylamine and didecylmethylamine.

The polyalkylene oxide ethers and esters useful herein as phase transfer agents may include, for example, polyoxyethylene (4) sorbitan monolaurate, polyoxyethylene (4) sorbitan monostearate, polyoxyethylene (8) stearate, polyoxyethylene (4) lauryl ether, and polyoxyethylene (4) nonylphenyl ether.

In addition to yielding gels at high temperatures, the starch derivatives herein also exhibit rapid viscosity increases upon only slight cooling after gelatinization. Viscosities of many of the starch derivatives, best observed by Brabender viscosity measurement, increase dramatically to or near to peak readings between the temperatures of 95° and 70° C. during cooling. This behavior differs markedly from the underivatized starch bases which rise in viscosity very gradually to reach peak readings at considerably lower temperatures (i.e., less than 50° C.).

As is generally expected from most substituted starches, gel strengths of the reversible gelling starches are somewhat weaker than the underivatized starch bases. The gelatinized starches herein are also sensitive to shear. If subjected to constant shear conditions during cooling, as encountered during Brabender viscosity analysis, the starches herein do not form a gel. If the stable starch pastes which result, however, are thereafter reheated and subsequently cooled without shear, the starches will indeed form gels at high temperatures.

The gelling starches herein may be thermally or chemically gelatinized. Thermal gelatinization is carried out by cooking the starch in water under conditions that will not have a degradative effect upon the starch or its derivatization. In order to obtain high temperature gelling properties the starch dispersions or solutions should have a pH within the range of about 3 to 8, preferably 4-6. At pHs of 9-10 and 1-2 no hot gels form, nor do they form after standing for several hours at room temperature. The gel can be reversed by reheating the gel or by adjusting the pH to 13 or above. The gel readily reforms on cooling or pH adjustment to less than 13.

Chemical gelatinization (also referred to as cold gelatinization) is typically carried out at room temperature using aqueous solutions of alkalies (e.g., calcium, barium, potassium, sodium, lithium, benzyltrimethylammonium, and tetramethylammonium hydroxide), certain salts (e.g., sodium salicylate, sodium, ammonium, or potassium thiocyanate, sodium and potassium iodide), and organic compounds (e.g., urea). Gelatinization takes place when the sorbed chemical exceeds a certain critical concentration. The presence of water is not mandatory. However, for the purposes herein, it will be present and necessary for the formation of the gel. For the purposes herein only alkali is used to effect the gelatinization with the relative amounts of water, alkali, and starch being adjusted as necessary to provide the necessary high pH and resulting gelatinization. The critical concentration level is dependent upon both the type of alkali and starch base. The swelling power of the reagents, in general, increases with concentration. A further discussion of the critical concentration level and examples of that level may be found in "Starch: Chemistry and Technology", Vol. I, ed. by R. L. Whistler and E. F. Pascall (New York: Academic Pres, 1967) at pages 304–306, as well as in "Handbook of WaterSoluble Gums and Resins", ed, by R. L. Davidson, Chapter 22: Starch and Its Modifications by M. W. Rutenberg, (New York: McGraw Hill Book Co., 1980) at pages 22-17 to 22-18.

The chemically gelatinized starches form a gel when the pH is lowered. For example, where the starch has been gelatinized with alkali at about pH 13, the gel forms when the pH is lowered to less than 12. The gel can be reversed by raising the pH or by heating the gel at a pH of 3–8. As with thermally-gelatinized starches, the gel readily reforms when the pH is lowered or the solution is cooled. The acid is added all at once to decrease the pH. As discussed previously, shear may interfere with the gel formation.

The following examples will more fully illustrate the practice of this invention but they are not intended to limit its scope. In the examples, all parts and percentages are given by weight and all temperatures are in degrees Celsius unless otherwise noted. The Brabender viscosities of the high temperature gelling starches herein were tested by the following procedure:

A total of 17.15–36.02 g. of anhydrous starch is slurried in sufficient distilled water to provide a total charge weight of 490 g. The 3.5–7.4% anhydrous solids slurries are then poured into the Brabender cup. The viscosity is measured using a Visco-Amylo-Graph equipped with a 700 cg tension cartridge (manufactured by C. W. Brabender Instruments, Inc., Hackensack, New Jersey) as follows: The starch slurry is rapidly heated to 95° C. and held at that temperature for 15 minutes to effect gelatinization. Thereafter, the temperature of the starch dispersion is cooled at a rate of approximately 1.5° C. per minute to 55° C. For the high amylose starch samples, 17% solids slurries were jet cooked prior to employing the above procedure.

EXAMPLE 1

This example illustrates the preparation of starch derivatives which are high temperature gelling. A series of long linear chain succinate derivatives of corn starch were prepared by reacting the starch with 10% of various $C_{10}$–$C_{18}$ linear alkyl or alkenyl substituted succinic anhydrides by the following procedure:

About 100 parts (as is) of corn starch and 0.7 parts trioctylmethylammonium chloride (TOMAC) phase-transfer agent were slurried in about 125 parts of tap water, and the pH was adjusted to 8 by the addition of dilute sodium hydroxide (3%). A total of 10 parts of alkyl or alkenylsuccinic anhydride reagent was added slowly to the agitated starch slurry and the pH was maintained at 8 by the metered addition of the dilute sodium hydroxide. Agitation was continued for from 5.5–25 hours at ambient temperature. After the reaction was complete, the pH was adjusted to about 5.5 with dilute hydrochloric acid (3:1). The resultant starch half-esters were recovered by filtration, washed three times with water having a pH of about 5–6, and air dried.

An 8 g (as is) portion of each starch derivative was added to 96 g water in a glass cup and placed in a boiling water bath (BWB). The starch slurry was stirred with a glass stirring rod for about two minutes while the starch gelatinized. A rubber stopper was then placed over the rod and cup while the starch continued to cook for a total of 20 minutes in order to effect complete gelatinization. Each starch was evaluated shortly after removal from the BWB and observed for the presence or absence of gel formation at high temperatures. A starch was termed to be high temperature (HT) gelling if rapid gel formation was observed while the starch cook was still hot (i.e., above 70° C.)

Corn starch was blended with n-octadecyl disodium succinate (which is incapable of reacting with a starch molecule) employing the same reaction conditions as described above. The gelling properties of this blend of starch and long linear chain succinate were compared with those of the starch derivatives.

Table I includes the high temperature gel formation data of the various starch half-esters.

TABLE I

| Succinic Anhydride Reagent | Hydrocarbon Chain Length | High Temp. Gel Formation |
|---|---|---|
| Control (no reagent) | — | none |
| n-Decenyl* | 10 | none |
| n-Dodecenyl* | 12 | none |
| n-Tetradecenyl | 14 | yes |
| n-Octadecyl | 18 | yes |
| n-Octadecenyl | 18 | yes |
| n-Octadecenyl Sulfosuccinic anhydride** | 18 | yes |
| n-Octadecyl disodium succinate (comparative) | 18 | none |

*The starch cook formed a very weak gel at room temperature upon standing.
**No phase transfer agent was used for starch derivative preparation.

The results showed that starch half-esters having a linear hydrocarbon chain containing at least 14 carbon atoms possessed high temperature gelling properties.

Brabender evaluation (described above) of the high temperature gelling succinate derivatives showed that all possessed dramatic viscosity increases compared to corn starch alone during the cooling cycle from 95° to 70° C. During this portion of the cooling cycle, the derivatives (evaluated at 6.9–7.4% solids) all increased in viscosity from about 700 to 1150 Brabender units over the increase experienced by the corn starch base alone.

EXAMPLE 2

This example compares the gel strength of a high temperature gelling corn starch derivative with an underivatized corn starch base while at 70° C. This example also compares the viscosity increase of each starch dispersion upon cooling.

Corn starch was reacted as described in Example 1 with 10% tetradecenylsuccinic anhydride in the presence of 1% Aliquat ® 336 (tricaprylylmethyl ammonium chloride obtained from General Mills Chemicals). Seven percent solids (based on dry basis) slurries of the derivatized starch (Y) and the underivatized corn starch base (X) were prepared. The samples were cooked in a BWB as in Example 1 then cooled to and maintained at 70° C. The gel strengths of both samples were measured employing a penetrometer (Stevens LFRA Texture Analyzer) after 1, 2, and 16 hours holding at 70° C. and compared to the gel strengths of gelatinized samples which were cooled and maintained at room temperature for 16 hours. The gel strengths were measured in grams employing probe #6 (a 1 inch diameter cylinder) at a speed setting of 0.5 for a distance of 0.04 mm. The results may be found in Table II.

TABLE II

| Time at 70° C. (hrs.) | GEL STRENGTH IN GRAMS | |
|---|---|---|
| | Corn Starch Control (X) | Tetradecenyl Succinate of Corn Starch (Y) |
| 1 | 26 | 62 |
| 2 | 25 | 82 |
| 16 | 29 | 105 |
| 16* | 168 | 108 |

*Hours at room temperature.

The results showed that the corn starch derivative had a significant gel structure while at 70° C. which increased over time to substantially the same gel strength as if it had been cooled to room temperature. The corn starch base, however, had no gel structure initially at 70° C. nor did it increase to any extent over time at that temperature. The room temperature gel strength of the derivative was seen to be less than that for the corn starch base. It is believed that complexation does decrease the amount of retrogradation somewhat, thus weakening the overall gel strength of the derivative.

Seven percent solids (dry basis) slurries of the tetradecenyl starch succinate Y and the corn starch control X were also compared by Brabender evaluation by the procedure described above with two minor variations. The total charge weight of each starch slurry was 461.7 grams instead of 490 grams and each starch dispersion was cooled to 27° C. instead of 55° C. The results, presented in the accompanying drawing, show that the viscosity of starch Y increased substantially upon cooling from only 95° to 80° C. At 70° C., starch Y had approximately reached its peak viscosity. The viscosity of control starch X did not begin to increase upon cooling until about 80° C., and then proceeded to increase only very gradually upon further cooling.

EXAMPLE 3

This example illustrates the preparation of high temperature gelling starches employing starch bases other than corn starch.

Samples were prepared and recovered as described in Example 2. The reaction and high temperature gelling property data of the starch samples may be found in Table III.

TABLE III

| Starch Base | Approx. % Amylose | Succinic Anhydride Reagent | % Treatment Level | Gelatinization Data | | |
|---|---|---|---|---|---|---|
| | | | | % Solids | RT Gel Form. | HT Gel Form. |
| Waxy Maize (comparative) | 1 | — | 0 | 6 | none | none |
| | | n-Tetradecenyl | 10 | 6 | none | none |
| | | n-Octadecyl | 10 | 6 | none | none |
| Rice | 17 | — | 0 | 7 | yes | none |
| | | n-Tetradecenyl | 10 | 7 | yes | yes |
| Tapioca | 18 | — | 0 | 6 | none | none |
| | | n-Tetradecenyl | 10 | 6 | yes | yes |
| Potato | 23 | — | 0 | 8 | none | none |
| | | n-Tetradecenyl | 10 | 8 | yes | yes |
| Corn Flour | 28[a] | — | 0 | 7 | yes | none |
| | | n-Tetradecenyl | 10 | 7 | yes | yes |
| High Amylose Corn[b] | 70 | — | 0 | 25 | yes | none |
| | | n-Tetradecenyl | 10 | 25 | yes | yes |
| | | n-Tetradecenyl | 30 | 25 | yes | yes |

[a]Based on starch content of flour.
[b]Samples were fully gelatinized by conventional jet-cooking at 300° F.

The results showed that other starch bases containing at least about 17% amylose may be used to prepare high temperature gelling derivatives. A low amylose-content base, such as waxy maize, was seen to not be useful herein.

Brabender evaluation also showed dramatic viscosity increases during the initial cooling cycle from 95° to 70° C. for the high temperature gelling starch derivatives over their respective bases except for the high amylose corn derivatives. Due to the fact that the high amylose derivatives were observed in cook evaluations without shear to begin gel formation at a higher temperature upon cooling than the other starch base derivatives, it was determined that these derivatives are more sensitive to the shear conditions of the Brabender evaluation. The waxy maize derivative showed no high temperature viscosity increase further indicating the necessity for sufficient amylose content in order for complexation to occur.

EXAMPLE 4

This example illustrates the effect of added sugars on the high temperature gelling properties of the starch succinate derivatives herein.

Aqueous slurries containing 7% solids anhydrous starch (tetradecenyl corn starch succinate of Example 2) and 20–30% sucrose or fructose were prepared and evaluated for high temperature gel formation and Brabender viscosity. The sugars did not inhibit high temperature gel formation or weaken the gel strength in comparison to a control sample which contained no added sugar. Only the rapid viscosity increase of the derivative in the presence of the sugars occurred at a somewhat lower temperature than the derivative without sugar (i.e., 75° C. instead of 83° C.).

EXAMPLE 5

This example illustrates the effect various salts have on the high temperature gelling properties of the starch succinate derivatives herein.

Aqueous slurries containing 7% solids anhydrous starch (tetradecenyl corn starch succinate of Example 2) and 2–5% of either sodium chloride, magnesium chloride, calcium chloride, or sodium phosphate were prepared and evaluated for high temperature gel formation and Brabender viscosity.

The results showed that at such treatment levels, sodium chloride and magnesium chloride do not inhibit high temperature gel formation. In fact, the presence of sodium chloride caused the rapid viscosity increase of the derivative to occur at a higher temperature than the derivative without sodium chloride (i.e., 89° C. instead of 82° C.) In the presence of calcium chloride and sodium phosphate, the succinate derivative was neither high temperature gelling or capable of forming a gel upon cooling to room temperature.

EXAMPLE 6

This example illustrates the thermal reversibility of the high temperature gelling starches.

Aqueous slurries (7% solids) of an underivatized corn starch base and the tetradecenyl corn starch succinate of Example 2 were cooked in a BWB for 20 minutes in order to fully gelatinize the starches and then cooled to room temperature for 24 hours. The samples both formed gels. As previously noted, the starch succinate was high temperature gelling while the corn starch base formed a gel only upon standing at room temperature.

The starch succinate and starch base gels were recooked in the BWB for 30 minutes with moderate initial stirring. The starch succinate gel readily melted to a flowable dispersion upon reheating having the same consistency as it previously had after gelatinization. Conversely, the corn starch gel did not readily melt, but rather exhibited a non-flowable, lumpy consistency. After removal from the BWB and upon recooling, the starch succinate again exhibited high temperature gelling properties. After cooling completely to room temperature for 24 hours, the corn starch gel was seen to possess a chunky texture while the starch succinate gel had the same uniform appearance as it had prior to reheating.

EXAMPLE 7

This example illustrates the effect crosslinking has on high temperature gelling starch derivatives.

A. Corn starch crosslinked with 0.003% epichlorohydrin was prepared as described in U.S. Pat. No. 2,500,950 (issued Mar. 21, 1950 to M. Konigsberg). Portions of the starch were then treated with either 10% octadecylsuccinic anhydride or 10% tetradecenylsuccinic anhydride and later cooked to observe gelatinization as in Example 1. Both derivatives possessed high temperature gelling properties not observed in the crosslinked base alone. The C-18 alkyl derivative was noted to have a noticeably weaker gel strength than its crosslinked base at room temperature as compared to the C-14 alkenyl derivative.

B. Corn starch was crosslinked with 0.002–0.02% phosphorous oxychloride as described in U.S. Pat. No. 2,328,537 (issued Sept. 7, 1943 to G. E. Felton et al.). The crosslinked starches were then treated with 10% tetradecenylsuccinic anhydride as in Example 1. The derivatives which were crosslinked with up to 0.01% of the crosslinking agent were high temperature gelling. More highly crosslinked samples (prepared with 0.015–0.02% crosslinking agent) were not high temperature gelling.

EXAMPLE 8

This example illustrates the effect other substituent groups have on high temperature gelling starch derivatives.

A. Hydroxypropylated starch samples were prepared as described below prior to being treated with tetradecenylsuccinic anhydride.

A total of 0.2 to 10 parts propylene oxide (PO) was added to a series of reaction vessels which each contained a slurry comprising 100 parts corn starch, 125 parts water, 1.5 parts sodium hydroxide and 25 parts sodium sulfate. The reaction vessels were sealed then agitated at 40° C. for 16 hours. After cooling to room temperature each slurry was adjusted to pH of 3 with aqueous 3:1 sulfuric acid then raised to pH 6 prior to recovery. The starch samples were recovered by filtration, washed 4 times with pH 6 water and air dried.

All hydroxypropylated starches were treated with 10% tetradecenylsuccinic anhydride (TDSA) as described in Example 2 and evaluated for high temperature gel formation. The results are shown in Table IV.

TABLE IV

| PO Treatment (%) | Cook (7% solids) | PO/TDSA Treatment (%) | Cook (7% solids) |
|---|---|---|---|
| 0.2 | not stable | 0.2/10 | hot gel |
| 1.0 | not stable | 1.0/10 | hot gel |
| 2.0 | not stable | 2.0/10 | hot gel |
| 3.0 | stable-cohesive | 3.0/10 | hot gel |
| 3.6 | stable-cohesive | 3.6/10 | hot gel |
| 5.0 | stable-cohesive | 5.0/10 | room temp. gel |
| 7.5 | stable-cohesive | 7.5/10 | no gel |
| 10.0 | stable-cohesive | 10.0/10 | no gel |

*after 2 hours

The results show that the samples treated with at least 2% propylene oxide produced stable starch cooks while those starches treated with less propylene oxide were not stable after cooling to room temperature. The results show that the dual-treated starches (i.e., PO and TDSA) were high temperature gelling when the starch was treated with <5% propylene oxide, corresponding to a theoretical degree of substitution (D.S.) of <0.144. At higher propylene oxide substitution levels (D.S. of 0.144), the dual-treated starches formed room temperature gels which were reversible. At even higher PO substitution levels (D.S. >0.144 up to 0.275), the dual-treated starches formed no gel.

The dual-treated samples produced weaker gels and appeared somewhat more shear sensitive than a starch sample treated only with the tetradecenylsuccinic anhydride reagent. Most significant was the effect provided by the treatment with the long chain reagent which reversed the stabilization due to moderate hydroxypropylation.

B. Cationic starch ethers described in U.S. Pat. No. 2,876,217 (cited previously) were prepared as described below prior to being treated with tetradecenyl succinic anhydride.

To a series of starch slurries comprising 100 parts corn starch and 125 parts water were added 0.5–2.1 parts calcium hydroxide (to maintain a reaction pH of at least 12) followed by 0.4 to 6.0 parts of a 50% aqueous solution of diethylaminoethylchloride hydrochloride (DEC). The reactions were conducted at room temperature for 18 hours. A 3:1 aqueous hydrochloric acid solution was added to adjust the pH to 3.0. Thereafter the starches were recovered by filtration, washed 4 times with pH 3 water and air dried. The cationic starches treated with at least 1% DEC which contained 0.14% nitrogen (dry basis) produced stable starch cooks while the starches treated with less DEC produced gels, though weaker than that of the corn base, after cooling to room temperature. All the cationic starches were further treated with 10% tetradecenylsuccinic anhydride as described in Example 1 and evaluated for high temperature gel formation.

All the dual-treated samples were high temperature gelling, possessing stronger gel structures than the above dual-treated hydroxypropylated samples. Upon cooking, the samples also foamed. The stronger gel formation may be attributed to the ionic interaction between the cationic and anionic substituents.

EXAMPLE 9

This example illustrates the use of other reagents which provide starch derivatives that possess high temperature gelling properties. Corn starch was treated with the reaction products of N-methylimidazole with $C_{10}$–$C_{16}$ alkyl carboxylic acid chlorides, benzoyl chloride and cyclohexanoyl chloride.

Starch was reacted with the reagents employing a procedure described in U.S. Pat. No. 4,020,272 (cited previously). The procedure comprised slurrying 100 parts corn starch (as is) in 150 parts water at pH 8 and then slowly adding the reagent to the slurry. The reaction was conducted for 2 to 3 hours at room temperature while maintaining the pH at 8 as described in Example 1. When the reaction was complete, the pH of the slurry was adjusted to 4 with 3:1 hydrochloric acid. The starch ester derivatives were recovered by filtration, washed three times with water having a pH of about 4, and air dried. The reaction data as well as the high temperature gelling properties of 7% solids slurries may be found in Table V.

TABLE V

| Reagent N—methylimidazolium chloride of | % Treatment Level | High Temp. Gel Formation |
| --- | --- | --- |
| Benzoic acid | 5 | none |
|  | 10 | none |
| Cyclohexanoic | 5 | none |
|  | 10 | none |
| Capric acid ($C_{10}$)* | 5 | none |
|  | 10 | none |
| Lauric acid ($C_{12}$) | 5 | yes |
| Myristic acid ($C_{14}$) | 5 | yes |
| Palmitic acid ($C_{16}$) | 5 | yes |

*The starch cook was stable at room temperature.

The results showed that only starch ester derivatives having a long hydrocarbon chain substituent comprising at least 12 carbon atoms produced high temperature gels. The cycloalkyl and aryl substituents, e.g., of cyclohexane and benzene did not produce high temperature gelling starches.

Brabender evaluation of the $C_{12}$–$C_{16}$ high temperature gelling derivatives at 7.35% anhydrous solids and 5.5 pH showed that all exhibited rapid viscosity increases during the cooling cycle. From 95° to 70° C., the derivatives each increased in viscosity by about 1,100 Brabender units over the increase experienced by the corn starch base alone.

EXAMPLE 10

High temperature gelling starch ethers were prepared employing long chain quaternary amine epoxide reagents. The reagents employed comprised the reaction products of epichlorohydrin with $C_{10}$–$C_{16}$ alkyl dimethyl amines.

Starch was reacted with the reagents employing the procedure described in U.S. Pat. No. 2,876,217 (cited previously). The procedure comprised slurrying 100 parts starch (as is) in 125 to 150 parts water containing 10 parts sodium sulfate and 2 parts sodium hydroxide. A total of 5–10 parts reagent was added. The mixture was agitated for 16 hours at 40° C. and then the pH was adjusted to 3 with 3:1 hydrochloric acid. The starch ethers were filtered (methanol was added to aid in the filtration), then washed three times with water having a pH of about 3, and air dried. The reaction and high temperature gelling data may be found in Table VI.

TABLE VI

| Starch Base | N,N—dimethyl-N—glycidyl-N—alkyl ammonium chloride Reagent | | % Nitrogen on starch (d.b.) | High Temp. Gel Form. |
| --- | --- | --- | --- | --- |
|  | Alkyl Carbon Length | Treatment Level (%) |  |  |
| Corn | 10* | 10 | 0.20 | none |
|  | 12* | 10 | 0.19 | none |
|  | 14 | 6 | 0.10 | yes |
|  | 16 | 5 | 0.15 | yes |
|  | 16 | 10 | 0.23 | yes |
| Tapioca | 16 | 5 | 0.10 | yes |
|  |  | 10 | 0.18 | yes |
| Potato | 16 | 5 | 0.08 | yes |
|  |  | 10 | 0.20 | yes |

*The starch cook formed a very weak gel at room temperature upon standing.

The results showed that only the starch ether derivatives having long hydrocarbon chain substituents comprising at least 14 carbon atoms produced high temperature gels.

Although not as dramatic as the starch succinates and full ester derivatives described above, Brabender evaluation of the corn based starch ethers herein at 7% anhydrous solids showed the derivatives to exhibit signficant increases in viscosity over the corn base (~200 Brabender units) above 70° C. while cooling.

EXAMPLE 11

This example illustrates the effect hydrolysis has on high temperature gelling starch derivatives.

Samples of corn starch were hydrolyzed with hydrochloric acid to water fluidities (WF's) of 9, 20, 25, and 40. Potato and tapioca starches were similarly hydrolyzed. The hydrolyzed samples were reacted with 10% tetradecenylsuccinic anhydride in the presence of 1.0% Aliquat ® 336 for 24 hours at room temperature, recovered as described in Example 1, and compared with the unhydrolyzed starch succinates of Example 3.

Aqueous 8 to 15% solids (as is) slurries of the starches were cooked as in Example 1 then evaluated for high temperature gelling properties. Of the fluidity corn starches, only those derivatives prepared from fluidities of 25 or less produced high temperature gels. As the degree of hydrolysis was increased, it was noted the resultant starch succinates provided weaker high temperature gels compared to the non-hydrolyzed derivative. The 40 WF sample did not gel, but remained stable during cooling and at room temperature.

None of the derivatized potato or tapioca fluidities were high temperature gelling.

Hydrolyzed corn starches having water fluidities of approximately 20 to 60 were also reacted with 10% of the $C_{14}$ quaternary amine epoxide reagent of Example 10 and compared at similar solids levels to the nonhydrolyzed derivative. All samples produced high temperature gels. However, as the degree of hydrolysis increased, it was again noted the high temperature gels became increasingly weaker.

The results indicate that some converted bases may be employed in the preparation of high temperature gelling starches. The particular starch base and the long chain derivatization were seen to influence the maximum degree of hydrolysis of a starch which will still produce an acceptable high temperature gel.

EXAMPLE 12

This example determines the pH at which the high temperature gelling starches hot gel.

Samples (6 g. each) of the corn starch half-ester formed by treatment with 10% tetradecenyl succinic anhydride were slurried in 94 g. of water. They were adjusted to pH values ranging from 1 through 10 by the addition of aqueous sodium hydroxide or hydrochloric acid as required. They were then cooked for 15 minutes in a boiling water bath. The cooks prepared at pH 1 and 2 were water thin due to acid hydrolysis. No gels were formed after cooling for several hours at room temperature. The cooks prepared at pH 3–8 formed hot gels. Those prepared at pH 9 and 10 did not form hot gels, nor did they form gels after cooling. The gels were thermally reversible, carried out by reheating and cooling at a pH of 3–8. They were also chemically reversible, carried out by adjusting the pH to 13 or above as shown in the next Example.

EXAMPLE 13

This example demonstrates that chemically gelatinized starches form reversible gels.

Samples (7.5 g. each) of the corn starch half-ester formed by treatment with 10% tetradecenyl succinic anhydride were slurried in 95 ml. of water and 5 ml. of 20% sodium hydroxide was added. The slurry (about pH 13) was stirred vigorously and after a few minutes the starch was fully gelatinized. Enough aqueous hydrochloric acid was added all at once to decrease the pH to 10.0, 6.0, 3.5, and 1.0. All of the starches showed gel formation upon lowering the pH. The gel was reversed by raising the pH of the gel to above 13 and reformed again on lowering the pH. The gel formed at pH 6 was also thermally reversible. The gels should be thermally reversible within the same pH range as the thermally-gelatinized starches, i.e., 3–8.

EXAMPLE 14

This example illustrates the preparation of starch half-acid esters by reacting corn starch with four different hydrophobic substituted succinic anhydrides under aqueous conditions in the presence of various phase transfer agents.

About 100 parts (as is) of granular corn starch and 0.7 parts phase transfer agent were slurried in about 125 to 150 parts of tap water, and the pH was adjusted to 8 by the addition of dilute sodium hydroxide. A total of 10 parts of a $C_8$–$C_{18}$ hydrophobic substituted succinic anhydride was added slowly to the agitated starch slurry, and the pH was maintained at 8 by the metered addition of the dilute sodium hydroxide. Agitation was continued for 18 to 20 hours at ambient temperature. After the reaction was complete, the pH was adjusted to about 5.5 with dilute hydrochloric acid (3:1). The resultant starch half-acid esters were recovered by filtration, washed three times with water having a pH of about 5–6, and air-dried.

The samples prepared may be found in Table VII. Similar starch reactions with the four succinic anhydride reagents were also conducted in the absence of any phase transfer agent in order to observe and compare the starch products after filtration and, in some samples, to compare the carboxyl content of the starches after cooking. The latter gives one an indication of the degree of substitution of similar starch reaction products.

TABLE VII

| Sample | Succinic Anhydride Substituent | Phase Transfer Agent |
|---|---|---|
| | | Quaternary salt: |
| A** | n-octenyl | tricaprylylmethyl ammonium chloride* ($C_{25-31}$) |
| B | n-tetradecenyl | benzyltriethyl ammonium chloride ($C_{12}$) |
| C | n-tetradecenyl | tetra-n-butyl ammonium chloride ($C_{16}$) |
| D | n-tetradecenyl | n-hexadecyltrimethyl ammonium bromide ($C_{19}$) |
| E | n-tetradecenyl | n-hexadecyl pyridinium bromide ($C_{21}$) |
| F | n-tetradecenyl | tricaprylylmethyl ammonium chloride* ($C_{25-31}$) |
| G | n-tetradecenyl | n-hexadecyl-tri-n-butyl phosphonium bromide ($C_{28}$) |
| H | n-tetradecenyl | tetra-n-octyl ammonium bromide ($C_{32}$) |
| I | n-octadecenyl | tricaprylylmethyl ammonium chloride* ($C_{25-31}$) |
| J** | branched octadecenyl | tetraethyl ammonium chloride monohydrate ($C_8$) |
| K | branched octadecenyl | trioctylmethyl ammonium chloride ($C_{25}$) |
| L | branched octadecenyl | tricaprylylmethyl ammonium chloride* ($C_{25-31}$) |
| | | Tertiary amine: |
| M | n-tetradecenyl | octyldimethylamine ($C_{10}$) |
| N | n-tetradecenyl | didecylmethyl amine ($C_{21}$) |

*Aliquat ® 336 was employed having a mixture of $C_8$–$C_{10}$ hydrocarbon radicals.
**Comparative The quaternary salts used in the preparation of starch samples A-I and L provided starch products after filtration in which little, if any, unreacted reagent remained on the starch filter cake in comparison to the control samples where significant unreacted reagent layers were present. Similar benefits were noted with the tertiary amine phase transfer agents.

Starch Sample A (Comparative) which employed the less hydrophobic octenylsuccinic anhydride, had a carboxyl content of 2.42% while a control sample prepared without the phase transfer agent had a carboxyl content of 5.35%. The results indicate that the phase transfer agent, in this case, facilitated reagent hydrolysis instead of improving the starch reaction.

Starch samples J (Comparative) and K were cooked at 7% starch solids in water and compared with the same starch product (O) prepared in the absence of a phase transfer agent. Samples J and O gave gels similar to that of unreacted corn starch. Sample K, however, did not form a gel upon cooling but exhibited a cohesive, fluid texture. The results show that a quaternary salt having a total of only 8 carbon atoms attached to the cation is not useful in the process herein.

Summarizing, the present invention provides modified starches having unique gelling properties which are prepared by chemically reacting an amylose containing starch base with an etherification or esterification reagent which will introduce a long linear hydrocarbon chain substituent therein. The aqueous gels formed by the starches are thermally and pH reversible and the thermally-reversible gels are hot gels.

The present invention provides an improved process for preparing starch half-acid esters in water by reacting starch under alkaline conditions with a hydrophobic-substituted cyclic dicarboxylic acid anhydride in the presence of a phase transfer agent.

What is claimed is:

1. A gelling agent, which comprises a starch derivative containing an ether or ester substituent group with an at least $C_{12}$ linear hydrocarbon chain, wherein the starch derivative is prepared by reacting an unmodified or modified starch base with an effective amount of an etherifying or esterifying reagent containing the hydrocarbon chain, the starch base having an amylose content of at least 17% by weight and the modified starch being a lightly derivatized, lightly converted, and/or lightly crosslinked starch; characterized in that a reversible gel is formed by an aqueous solution or dispersion of the starch derivative obtained by thermal-gelatinization at a pH of about 3-8 upon cooling or obtained by room temperature alkali-gelatinization at pH 13 or above upon pH adjustment to below pH 13.

2. The gelling agent of claim 1, wherein the reversible gel is formed at a temperature above 70° C. and below that temperature at which the gel becomes thermoreversible, with the aqueous solution or dispersion of the starch derivative exhibiting a substantially greater increase in viscosity during cooling from 95° to 70° C. than that of a modified or unmodified starch without the substituent with the at least $C_{12}$ linear hydrocarbon chain.

3. The gelling agent of claim 1, wherein the starch base is selected from the group consisting of corn, high amylose corn, tapioca, potato, and rice; wherein the derivative is prepared by reacting the starch base with at least about 5% of the etherifying or esterifying derivatizing reagent containing the at least $C_{12}$ linear hydrocarbon chain; and wherein the reversible gel is formed by an aqueous solution or dispersion of the starch derivative obtained by thermal-gelatinization at a pH of about 4-7 upon cooling or obtained by room temperature alkali-gelatinization at pH 13 or above upon pH adjustment to about 1-10.

4. The gelling agent of claim 3, wherein about 5 to 10% of the etherifying or esterifying reagent is employed.

5. The gelling agent of claim 3, wherein the modified starch is a starch derivatized with up to about 3% propylene oxide, a starch converted to a water fluidity of 60 or less, and/or a starch crosslinked with less than 0.015% of a crosslinking agent.

6. The gelling agent of claim 3, wherein the starch derivative is the ester reaction product of starch and an imidazolide or N,N'-disubstituted imidazolium salt of a carboxylic or sulfonic acid-containing the linear hydrocarbon with 12 to 16 atoms.

7. The gelling agent of claim 3, wherein the starch derivative is the ester reaction product of starch and a cyclic dicarboxylic acid anhydride substituted with the linear chain hydrocarbon containing 14 to 18 carbon atoms.

8. The gelling agent of claim 3, wherein the starch derivative is the ether reaction product of starch and etherifying reagent, the reagent being the reaction product of an epihalohydrin and a tertiary amine containing the linear chain hydrocarbon which contains at least 14 to 16 carbon atoms.

9. The gelling agent of claim 3, wherein the hydrocarbon chain is unsaturated.

10. A gel, characterized by its thermoreversibility which consists essentially of an aqueous solution or dispersion at a pH of about 3-8 of an effective amount of the gelling agent of claim 1.

11. A process for the reversible reversal of the gel of claim 10 comprising heating the gel to a temperature at which the gel becomes fluid.

12. A gel, characterized by its pH-reversibility, which consists essentially of an aqueous solution or dispersion at a pH of about 1-10 of an effective amount of the gelling agent of claim 1.

13. A process for the reversible reversal of the gel of claim 12 comprising adjusting the pH of the gel to a value of 13 or above.

14. An improved process for preparing a granular starch half-acid ester in water comprising the step of reacting under aqueous alkaline conditions the granular starch and a hydrophobic hydrocarbon-substituted cyclic dicarboxylic acid anhydride wherein the hydrocarbon substituent is $C_{10}$ or greater; wherein the improvement comprises conducting the reaction in the presence of a phase transfer agent.

15. The process of claim 14, wherein the phase transfer agent is a quaternary organic salt having the formula $(AM)^+X^-$ wherein M is selected from the group consisting of nitrogen, phosphorous, arsenic, antimony, and bismuth; A is the organic portion of the salt covalently bonded to M comprising a plurality of monovalent or polyvalent hydrocarbon radicals having a total sum of at least 10 carbon atoms, and X is an anion.

16. The process of claim 15, wherein the phase transfer agent is selected from the group consisting of benzyltriethyl ammonium chloride, tetra-n-butyl ammonium chloride, n-hexadecyltrimethyl ammonium bromide, n-hexadecyl pyridinium bromide, n-hexadecyltri-n-butyl phosphonium bromide, tetra-n-octyl ammonium bromide, trioctylmethyl ammonium chloride, tricaprylylmethyl ammonium chloride and tridecylmethyl ammonium chloride.

17. The process of claim 16, wherein the hydrocarbon substituent of the cyclic dicarboxylic acid anhydride is $C_{10}$ to $C_{18}$.

18. The process of claim 17, wherein the hydrophobic hydrocarbonsubstituted cyclic dicarboxylic acid anhydride is tetradecenylsuccinic anhydride.

19. The process of claim 14 wherein the phase transfer agent is a tertiary amine with hydrocarbon substituents having a total sum of at least 10 carbon atoms.

20. The process of claim 14 wherein the phase transfer agent is a polyalkylene oxide ether or ester.

* * * * *